(12) United States Patent
Matsumoto

(10) Patent No.: US 10,354,370 B2
(45) Date of Patent: Jul. 16, 2019

(54) IMAGE PROCESSOR, IMAGE PROCESSING METHOD, AND PROGRAM

(71) Applicant: Panasonic Intellectual Property Management Co., Ltd., Osaka (JP)

(72) Inventor: Kentaro Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 61 days.

(21) Appl. No.: 15/362,166

(22) Filed: Nov. 28, 2016

(65) Prior Publication Data

US 2017/0278282 A1    Sep. 28, 2017

(30) Foreign Application Priority Data

Mar. 24, 2016 (JP) ................... 2016-060980
Nov. 8, 2016 (JP) ................... 2016-217737

(51) Int. Cl.
*G06T 5/00* (2006.01)

(52) U.S. Cl.
CPC .... *G06T 5/009* (2013.01); *G06T 2207/10024* (2013.01); *G06T 2207/20008* (2013.01)

(58) Field of Classification Search
CPC ..................................................... H04N 1/60
See application file for complete search history.

(56) References Cited

U.S. PATENT DOCUMENTS

| 2003/0099407 A1* | 5/2003 | Matsushima | ........ H04N 1/4074 |
| | | | 382/274 |
| 2006/0034502 A1* | 2/2006 | Kaji | ........................ G06T 5/009 |
| | | | 382/132 |
| 2007/0041637 A1 | 2/2007 | Matsushima | |
| 2007/0076974 A1* | 4/2007 | Miyazawa | .............. G06T 5/009 |
| | | | 382/274 |
| 2007/0211959 A1* | 9/2007 | Hayaishi | ............ G06K 9/00234 |
| | | | 382/274 |
| 2009/0034838 A1* | 2/2009 | Umeda | ................ H04N 1/6027 |
| | | | 382/167 |

(Continued)

FOREIGN PATENT DOCUMENTS

| JP | 6-230760 | 8/1994 |
| JP | 2003-169231 | 6/2003 |

*Primary Examiner* — Phi Hoang
(74) *Attorney, Agent, or Firm* — McDermott Will & Emery LLP

(57) ABSTRACT

An image processor includes a curve generator and a gradation correcting unit. Based on a predetermined correspondence relationship between average luminance of an image and a gradation correction curve, the curve generator generates, in accordance with average luminance of an input image, a common curve, i.e. a gradation correction curve used to correct a gradation of the input image. The gradation correcting unit uses in common the common curve generated by the curve generator for red, green, and blue color signals of the input image to correct gradations of the red, green, and blue color signals. Based on first average luminance, i.e. an average value of luminance of a first region in the input image, second average luminance, i.e. an average value of luminance of a predetermined-colored second region included in the first region, and an area of the second region, the curve generator generates a common curve.

11 Claims, 12 Drawing Sheets

(56) References Cited

U.S. PATENT DOCUMENTS

2009/0279665 A1* 11/2009 Takahashi ............... A61B 6/00
378/62
2013/0057599 A1* 3/2013 Teranuma .......... G02B 27/2264
345/690

* cited by examiner

IMAGE PROCESSOR, IMAGE PROCESSING METHOD, AND PROGRAM

BACKGROUND

1. Technical Field

The present disclosure relates to an image processor.

2. Description of the Related Art

A γ (gamma) correction is performed for an image signal in line with a characteristic of a display such as liquid crystal display. Unexamined Japanese Patent Publication No. H06-230760, for example, discloses a technology for changing a correction content of a γ correction based on a signal content of an image signal and a display characteristic of a display device. This technology thus automatically switches a γ curve in response to a content of an input signal.

SUMMARY

The present disclosure provides an image processor capable of improving an image quality.

An image processor according to the present disclosure includes a curve generator and a gradation correcting unit. Based on a predetermined correspondence relationship between average luminance of an image and a gradation correction curve, the curve generator generates, in accordance with average luminance of an input image, a common curve that is a gradation correction curve used to correct a gradation of the input image. The gradation correcting unit uses in common the common curve generated by the curve generator for each of a red signal, a green signal, and a blue signal of the input image to correct a gradation of each of the red signal, the green signal, and the blue signal. Based on first average luminance that is an average value of luminance of a first region in the input image, second average luminance that is an average value of luminance of a predetermined-colored second region included in the first region, and an area of the second region, the curve generator generates the common curve.

According to the present disclosure, an image quality can be improved. In particular, the present disclosure can naturally brighten an entirely dark image that is difficult to be viewed by a viewer so as to make the image easily viewable by the viewer.

DETAILED DESCRIPTION

Figure 1:
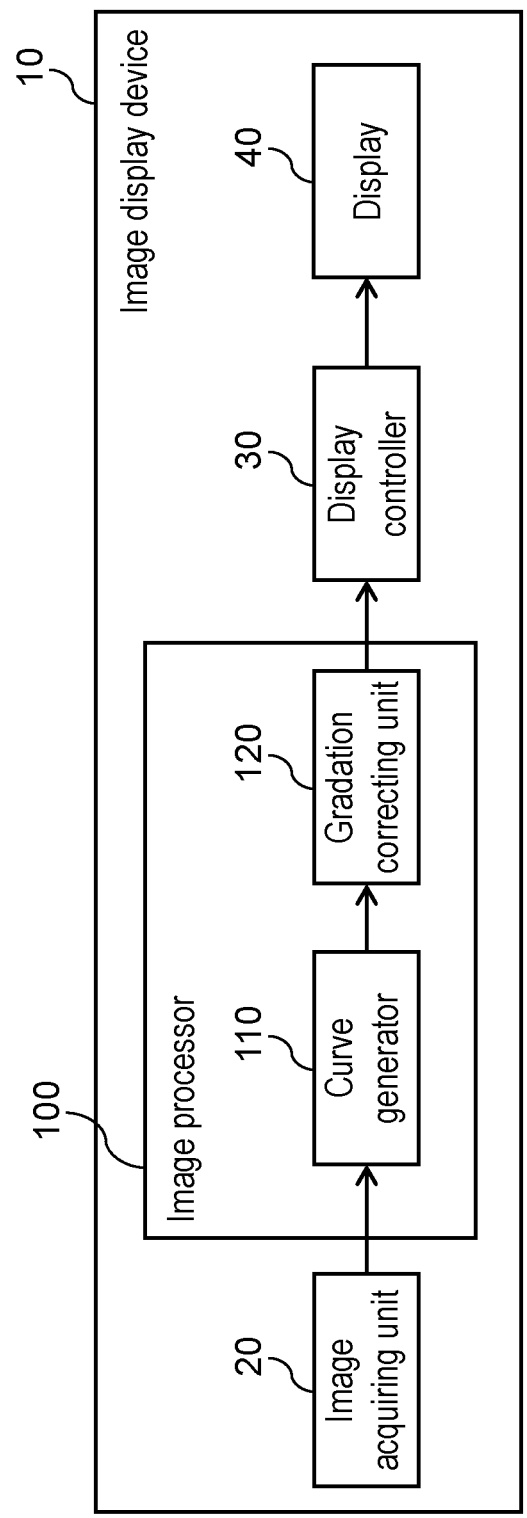
FIG. 1 is a functional block diagram of an image display device according to a first exemplary embodiment.

With reference to the drawings appropriately, exemplary embodiments will be described below in detail. However, some descriptions may not be provided more than necessary. For example, a well-known item may not be described in detail and a substantially identical configuration may not be described in a duplicated manner. This is to avoid an unnecessarily redundant description, but to help easy understanding of below descriptions by those skilled in the art.

The inventors of the present disclosure have provided the accompanying drawings and the descriptions below so that those skilled in the art can fully understand the present disclosure, and do not intend to limit the subject described in the claims by these drawings and descriptions. In other words, the exemplary embodiments described below merely illustrate examples of the present disclosure. Therefore, numerical values, shapes, materials, components, arrangements and connections of the components, steps, and an order of the steps illustrated in the below exemplary embodiments merely represent examples, and are not intended to limit the technology of the present disclosure. The components included in the below exemplary embodiments, but excluded from the independent claims that illustrate the highest concepts of the present disclosure are described as optional components.

The drawings are merely schematic drawings, and are not necessarily exactly illustrated. Thus, scales used in the drawings do not always conform to actual scales. In the drawings, substantially identical configurations are applied with identical numerals or symbols for which duplicated descriptions are omitted or simplified.

First Exemplary Embodiment

With reference to FIGS. 1 to 8, an image processor and other devices according to an exemplary embodiment will be described below.

1. Configuration

FIG. 1 is a functional block diagram of image display device 10 according to the first exemplary embodiment. As shown in FIG. 1, image display device 10 includes image acquiring unit 20, display controller 30, display 40, and image processor 100.

Image acquiring unit 20 acquires an input image. The input image is a still image or a moving image (video). The input image is, for example, an RGB image that includes a plurality of pixels arranged in a matrix. Each of the plurality of pixels includes a red color (R) signal, a green color (G) signal, and a blue color (B) signal.

Image acquiring unit 20 is achieved by, for example, a tuner, a decoder, and other devices, so as to receive a broadcast wave and other radio waves, to decode image data included in the broadcast wave, and to acquire an input image. In addition, image acquiring unit 20 may be achieved by a communication interface and other devices to acquire, via a network such as an internet, a streaming-delivered image and other images as an input image. Image acquiring unit 20 may also read image data recorded in a recording medium such as Hard Disk Drive (HDD) or flash memory to acquire an input image.

Display controller 30 performs a control for displaying on display 40 an image processed by image processor 100.

Display 40 displays the image processed by image processor 100. Display 40 is achieved by, for example, a liquid crystal display, an organic electroluminescence (EL) display, a plasma display, a projector, or another device.

Image processor 100 processes the input image acquired by image acquiring unit 20. Specifically, image processor 100 corrects a gradation of the input image. In the first exemplary embodiment, image processor 100 processes an input image by a frame unit. Image processor 100 generates, based on the input image, a gradation correction curve, and corrects, using the generated gradation correction curve, a gradation of each pixel in the input image.

As shown in FIG. 1, image processor 100 includes curve generator 110 and gradation correcting unit 120. Image processor 100 is achieved by, for example, a nonvolatile memory stored with an image processing program, a volatile memory used as a temporary storage region for executing the image processing program, an input/output port, a processor for executing the image processing program, and other components.

Curve generator 110 generates a common curve that is a gradation correction curve used to correct a gradation of an input image. In the first exemplary embodiment, curve generator 110 generates a common curve for an input image in a frame unit. In other words, a common curve is used in common to correct a gradation of each of an R signal, a G signal, and a B signal in an image. Curve generator 110 generates a common curve in accordance with a feature value determined by a first region included in an input image and a second region included in the first region. A detailed configuration and operation of curve generator 110 will be described later.

Gradation correcting unit 120 uses in common the common curve generated by curve generator 110 for each of an R signal, a G signal, and a B signal in an input image to correct a gradation of each of the R signal, the G signal, and the B signal. By using in common the common curve for each of an R signal, a G signal, and a B signal, a simplified process can be achieved.

In the first exemplary embodiment, gradation correcting unit 120 uses a common curve for an input image in a frame unit to correct a gradation. Specifically, gradation correcting unit 120 uses in common the common curve for all of R signals, G signals, and B signals of all pixels in an input image in a frame unit.

2. Input Image

Figure 2:
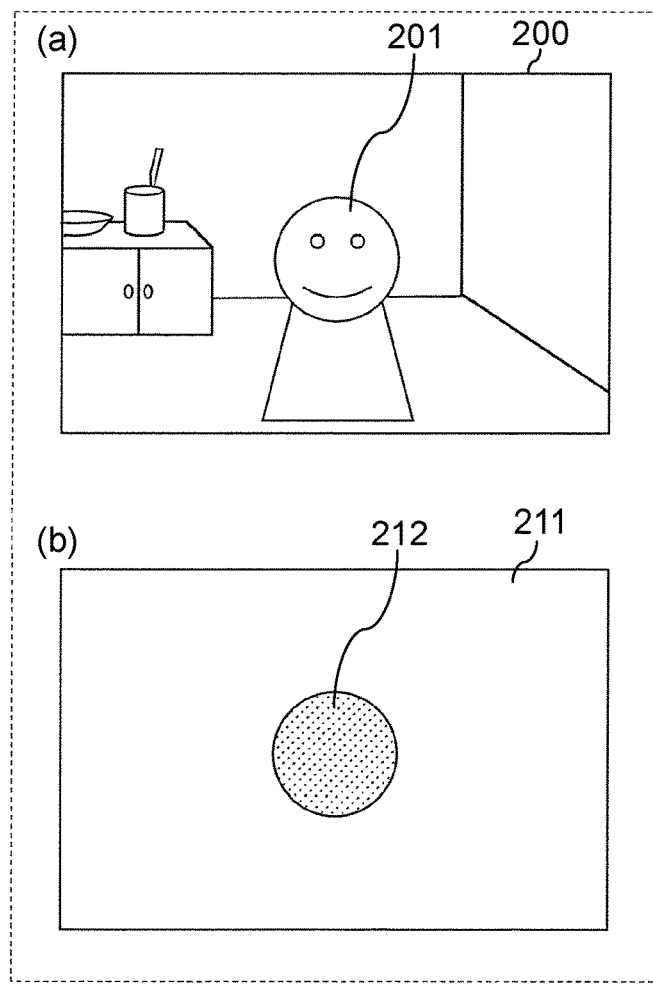
FIG. 2 shows an input image to be input into an image processor according to the first exemplary embodiment, and a view illustrating a first region and a second region in the input image.

With reference to FIG. 2, input image 200 to be processed by image processor 100 will now be described herein. FIG. 2(a) is an input image 200 to be input into image processor 100 according to the first exemplary embodiment, and FIG. 2(b) is a view illustrating first region 211 and second region 212 in input image 200.

First region 211 is an entire region of input image 200 (specifically, entire screen).

Second region 212 is a predetermined-colored region included in first region 211. In the first exemplary embodiment, second region 212 is a memory color region. A memory color is a color that is imaged and memorized by human beings, and includes, for example, a skin color, a green color, or a sky blue color. In the first exemplary embodiment, second region 212 is a skin color region, and corresponds to skin region 201 such as a face of a person included in input image 200.

3. Gradation Correction Curve

Figure 3:
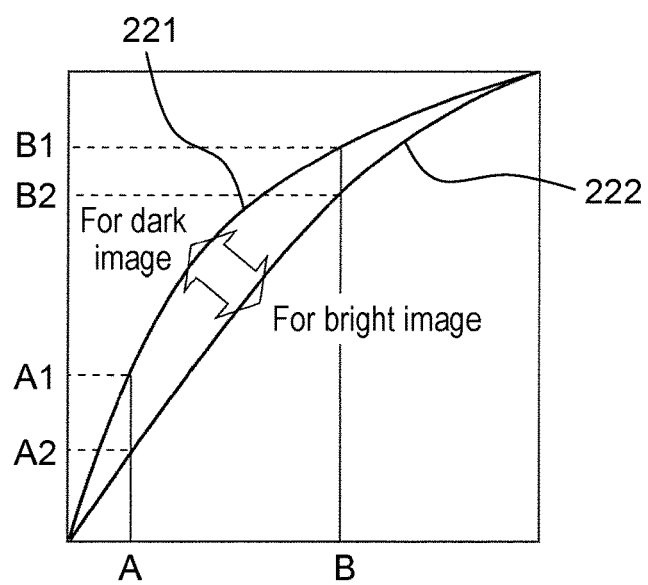
FIG. 3 is a graph illustrating a relationship between a gradation correction curve used by the image processor according to the first exemplary embodiment and average luminance of pixels.

Next, with reference to FIG. 3, a gradation correction curve used to correct a gradation of an input image, in the first exemplary embodiment will be described. FIG. 3 is a graph illustrating a relationship between a gradation correction curve used by image processor 100 according to the first exemplary embodiment and average luminance of pixels.

A gradation correction curve is a curve for converting an input value ($Y_{in}$) into a predetermined output value ($Y_{out}$). Specifically, the gradation correction curve is a gamma curve (γ curve) used for a gamma (γ) conversion, and is represented by $Y_{out}=Y_{in}^{\,}(1/\gamma)$.

In FIG. 3, two gradation correction curves 221 and 222 are shown. In FIG. 3, a horizontal axis is for an input value, while a vertical axis is for an output value. For example, when an input value is "A," an output value is "A1" when gradation correction curve 221 is used, while an output value is "A2" when gradation correction curve 222 is used. When an input value is "B," an output value is "B1" when gradation correction curve 221 is used, while an output value is "B2" when gradation correction curve 222 is used.

In FIG. 3, A1>A2, and B1>B2. This means that using gradation correction curve 221, rather than using gradation correction curve 222, can convert an input value into a larger value.

In the first exemplary embodiment, the gradation correction curve has a predetermined correspondence relationship with a feature value of an image. A feature value of an image is, for example, average luminance of the image. Specifically, a feature value of an image is average luminance of a predetermined region (for example, entire region) in the image.

Gradation correction curve 221 is a correction curve used when average luminance of an image is lower (i.e. the image is dark). Gradation correction curve 222 is a correction curve used when average luminance of an image is higher (i.e. the image is bright). Specifically, by using gradation correction curve 221, a dark portion in a dark image can be brighter, while a bright portion is kept almost unchanged.

In the first exemplary embodiment, the higher average luminance of an image, an associated gradation correction curve becomes a curve having a smaller curvature (an almost straight line) at where an input value and an output value match ($Y_{out}=Y_{in}$; γ=1) (for example, gradation correction curve 222). The lower average luminance of an image, the associated gradation correction curve becomes a curve that converts greater a region in which an input value is lower, while keeps almost unchanged a region in which an input value is higher (i.e. curve having a larger curvature) (γ<1; for example, gradation correction curve 221).

In other words, in the first exemplary embodiment, a correspondence relationship is designated between average luminance of an image and a gradation correction curve so that the higher average luminance of the image (bright image), a curve becomes a curve having a smaller curvature (an almost straight line), while the lower average luminance of the image (dark image), a curve largely bends.

4. Configuration of Curve Generator

Based on the correspondence relationship shown in FIG. 3, curve generator 110 generates a common curve in accordance with average luminance of input image 200. Specifically, based on first average luminance that is an average value of luminance of first region 211, second average luminance that is an average value of luminance of second region 212, and an area of second region 212, curve generator 110 generates a common curve. In the first exemplary embodiment, curve generator 110 uses the second average luminance and the area of second region 212 to correct the first average luminance, to calculate correction luminance, and to generate a common curve in accordance with the calculated correction luminance.

Figure 4:
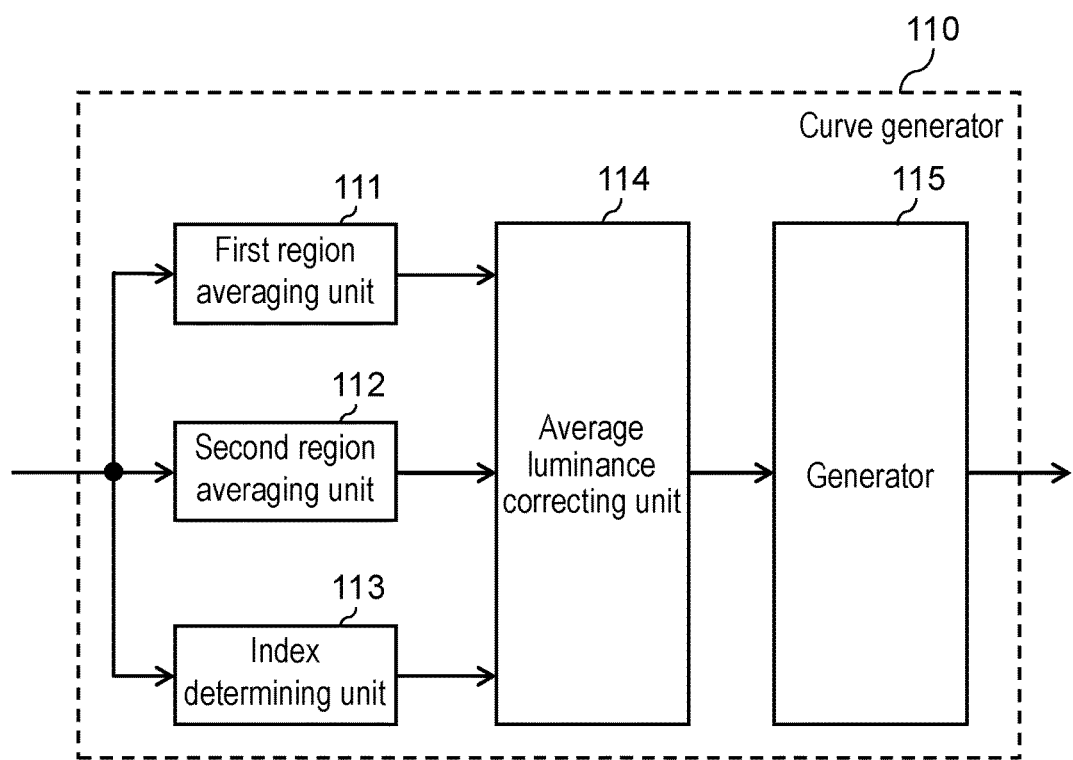
FIG. 4 is a functional block diagram illustrating a detailed configuration of a curve generator of the image processor according to the first exemplary embodiment.

FIG. 4 is a functional block diagram illustrating a detailed configuration of curve generator 110 of image processor 100 according to the first exemplary embodiment. As shown in FIG. 4, curve generator 110 includes first region averaging unit 111, second region averaging unit 112, index determining unit 113, average luminance correcting unit 114, and generator 115.

First region averaging unit 111 calculates, as first average luminance, an average value of luminance of all pixels included in first region 211. Specifically, first region averaging unit 111 averages, with all the pixels, a luminance signal (Y signal) calculated from an R signal, a G signal, and a B signal in each of the pixels to calculate first average luminance. First average luminance may be an average value of all R signals, G signals, and B signals in all pixels. First average luminance may otherwise be a value obtained by averaging, with all pixels, a maximum signal per pixel, among an R signal, a G signal, and a B signal.

Second region averaging unit 112 calculates, as second average luminance, an average value of luminance of all pixels included in second region 212. A specific method for calculating an average value is identical to a method performed by first region averaging unit 111.

Index determining unit 113 determines an index based on second region 212. An index corresponds to a percentage of how many second region 212 is focused on when first average luminance is corrected. In the first exemplary embodiment, an index is a correction parameter α shown in FIG. 5. Based on a graph shown in FIG. 5, index determining unit 113 determines a correction parameter α in accordance with an area ratio of second region 212.

Figure 5:
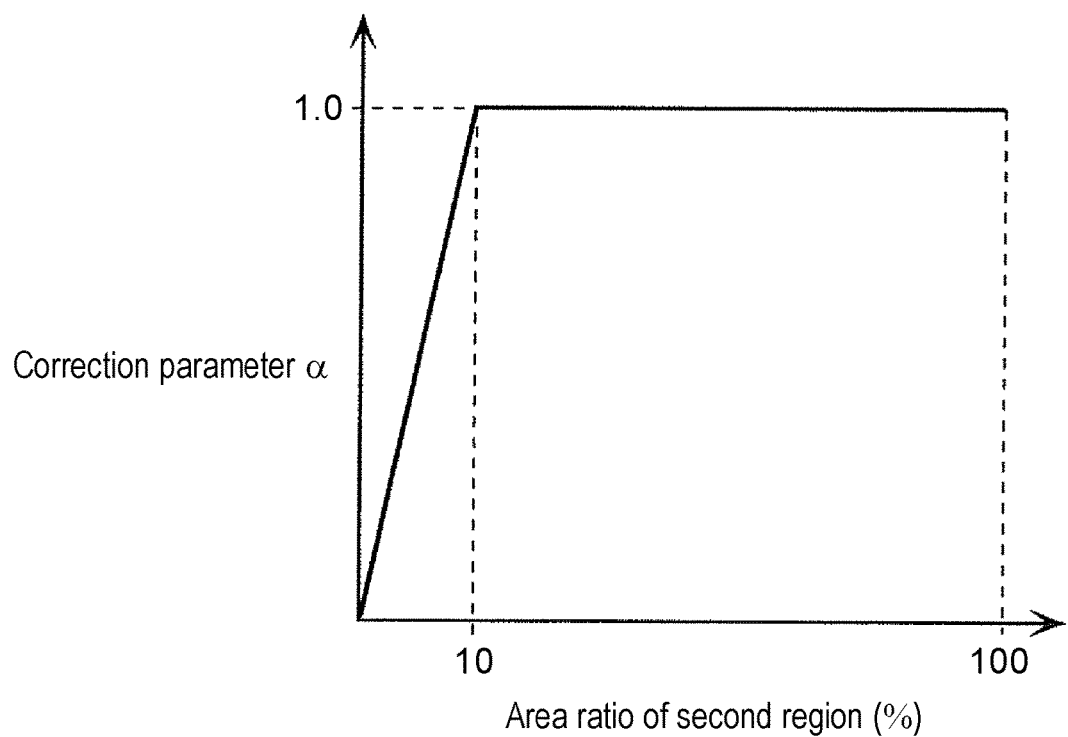
FIG. 5 is a graph illustrating a relationship between an area ratio of a second region and a correction parameter in an index determining unit according to the first exemplary embodiment.

FIG. 5 is the graph illustrating a relationship between an area ratio of second region 212 and a correction parameter α in index determining unit 113 according to the first exemplary embodiment. In FIG. 5, a horizontal axis is for an area ratio of second region 212, while a vertical axis is for a correction parameter α.

An area ratio of second region 212 is a percentage of an area of second region 212 to an area of first region 211. An area of first region 211 is the number of pixels included in first region 211. In the first exemplary embodiment, since first region 211 occupies an entire region of input image 200, an area of first region 211 is the number of all pixels in input image 200. An area of second region 212 is the number of pixels included in second region 212. In the first exemplary embodiment, an area of second region 212 is the number of pixels in skin region 201 in input image 200.

A correction parameter α is an example of index. Specifically, a correction parameter α is a weighting factor used for performing a weighting addition between first average luminance and second average luminance.

In the first exemplary embodiment, index determining unit 113 determines whether or not first average luminance of first region 211 is lower than average luminance of second region 212. When first average luminance is lower than second average luminance, index determining unit 113 determines a correction parameter α in accordance with an area ratio of second region 212. When first average luminance is higher than second average luminance, index determining unit 113 specifies a correction parameter α to 0 regardless of an area ratio of second region 212.

For example, when input image 200 is entirely dark, but skin region 201 is bright, first average luminance is lower than second average luminance. Index determining unit 113 in this case determines a correction parameter α based on the graph shown in FIG. 5. Generator 115 thus generates a common curve in accordance with correction luminance corrected based on the second average luminance.

When input image 200 is entirely bright, but skin region 201 is dark, on the other hand, first average luminance is higher than second average luminance. Index determining unit 113 specifies in this case a correction parameter α to 0. Generator 115 thus generates a common curve in accordance with the first average luminance. In other words, when skin region 201 is dark, a common curve is generated regardless of a magnitude of second average luminance.

Average luminance correcting unit 114 uses second average luminance and an area of second region 212 to correct first average luminance and to calculate correction luminance. Specifically, average luminance correcting unit 114 follows an equation 1 below to perform a weighting addition between first average luminance $Y_1$ and second average luminance $Y_2$ and to calculate correction luminance $Y_c$.

$$Y_c = (1-\alpha) \times Y_1 + \alpha \times Y_2 \qquad \text{Equation 1}$$

In the equation 1, α is a correction parameter determined by index determining unit 113.

In an example shown in FIG. 5, when an area ratio of second region 212 is equal to or above 10%, a correction parameter α stays constant at 1.0. In short, as shown in the equation 1, correction luminance $Y_c$ becomes equal to second average luminance $Y_2$.

When an area ratio of second region 212 is in a range from 0% to 10% inclusive, a correction parameter α linearly transitions in a range from 0 to 1.0 inclusive relative to an area ratio of second region 212. In other words, the larger an area ratio of second region 212, the larger a value of a correction parameter α. This means that the larger the area ratio of second region 212, the larger in percentage second average luminance $Y_2$ included in correction luminance $Y_c$. In other words, second region 212 is focused on to correct first average luminance $Y_1$.

Based on a predetermined correspondence relationship between average luminance of an image and a gradation correction curve, generator 115 generates a common curve in accordance with correction luminance $Y_c$.

Figure 6:
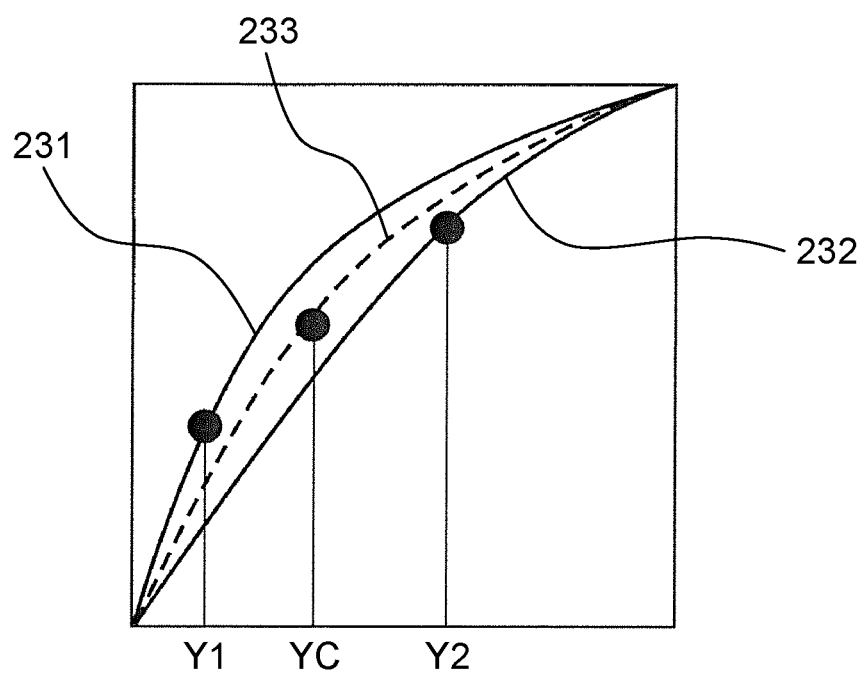
FIG. 6 is a graph for describing a gradation correction curve generation method performed by the curve generator according to the first exemplary embodiment.

FIG. 6 is a graph for describing a gradation correction curve generation method performed by curve generator 110 according to the first exemplary embodiment. In FIG. 6, a horizontal axis shows first average luminance $Y_1$, second average luminance $Y_2$, and correction luminance $Y_c$. Correction luminance $Y_c$ is a value calculated by following the equation 1, and takes a value between first average luminance $Y_1$ and second average luminance $Y_2$.

FIG. 6 shows three gradation correction curves. Gradation correction curve 231 is a gradation correction curve generated in accordance with first average luminance $Y_1$. Gradation correction curve 232 is a gradation correction curve generated in accordance with second average luminance $Y_2$. Common curve 233 is a gradation correction curve generated in accordance with correction luminance $Y_c$. As shown in FIG. 6, common curve 233 is a curve that has intermediate features of gradation correction curve 231 and gradation correction curve 232. For example, a γ value of common curve 233 is in a range from a γ value of gradation correction curve 231 and a γ value of gradation correction curve 232.

In the first exemplary embodiment, for example, 17 different gradation correction curves are preliminarily provided. The 17 gradation correction curves are preliminarily stored in a storage unit (not shown) in image processor 100. The 17 gradation correction curves are each associated with predetermined average luminance. When average luminance is represented in a range from "0" to "255," for example, the 16 gradation correction curves are allocated with average luminance per a multiple of "16." The 17th correction curve is virtually allocated to "256," and is provided to entirely cover the above described range of average luminance.

Generator 115 selects, from the 17 gradation correction curves, two gradation correction curves associated with average luminance close to correction luminance $Y_c$, and interpolates the selected two gradation correction curves to generate common curve 233 corresponding to correction luminance $Y_c$. When correction luminance $Y_c$ is "135," for example, generator 115 interpolates a gradation correction curve associated with "128" and a gradation correction curve associated with "144" to generate common curve 233.

The number of gradation correction curves, an allocation method to average luminance, and other related contents are not limited to the above described examples. The number of gradation correction curves may be, for example, only two.

5. Operation (Image Processing Method)

Figure 7:
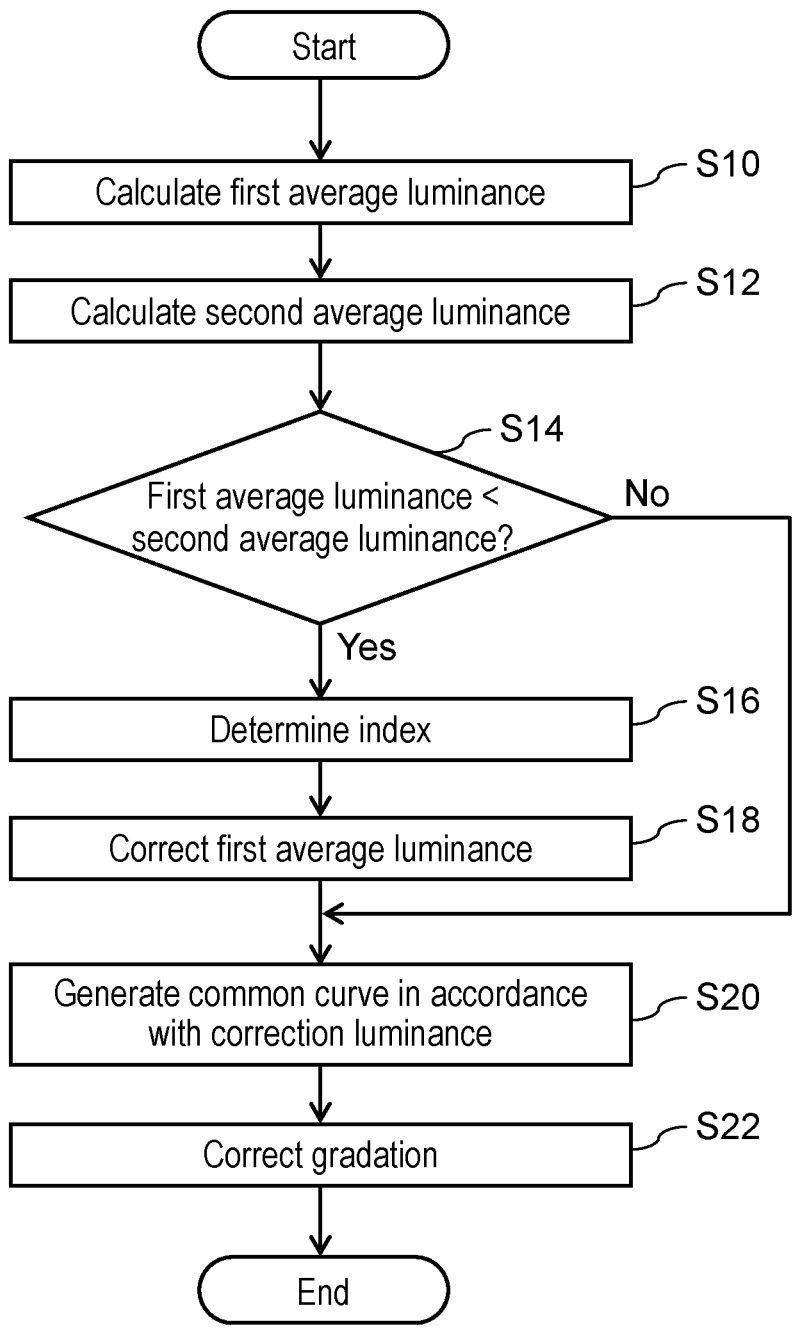
FIG. 7 is a flowchart illustrating an operation (image processing method) of the image processor according to the first exemplary embodiment.

Next, with reference to FIG. 7, an operation (image processing method) of image processor 100 according to the first exemplary embodiment will be described. FIG. 7 is a flowchart illustrating the operation (image processing method) of image processor 100 according to the first exemplary embodiment.

First region averaging unit 111 first calculates first average luminance $Y_1$ (S10). Next, second region averaging unit 112 calculates second average luminance $Y_2$ (S12). Second average luminance $Y_2$ may be calculated before a calculation of first average luminance $Y_1$, or may be calculated in parallel to the calculation of first average luminance $Y_1$.

Next, index determining unit 113 determines whether or not first average luminance $Y_1$ is lower than second average luminance $Y_2$ (S14). When first average luminance $Y_1$ is lower than second average luminance $Y_2$ (Yes in S14), index determining unit 113 determines an index (S16). Specifically, index determining unit 113 calculates an area ratio of second region 212, and then, in accordance with the calculated area ratio, calculates a correction parameter α based on the graph shown in FIG. 5.

Next, average luminance correcting unit 114 uses the correction parameter α to correct first average luminance $Y_1$ (S18). Specifically, average luminance correcting unit 114 follows the equation 1 to calculate correction luminance $Y_c$.

Next, based on the correspondence relationship shown in FIG. 3, generator 115 generates a common curve in accordance with correction luminance $Y_c$ (S20). Gradation correcting unit 120 then uses the common curve to correct a gradation of input image 200 (S22). Input image 200 in which the gradation is corrected is displayed, via display controller 30, on display 40.

6. Effect and Other Benefits

Figure 8:
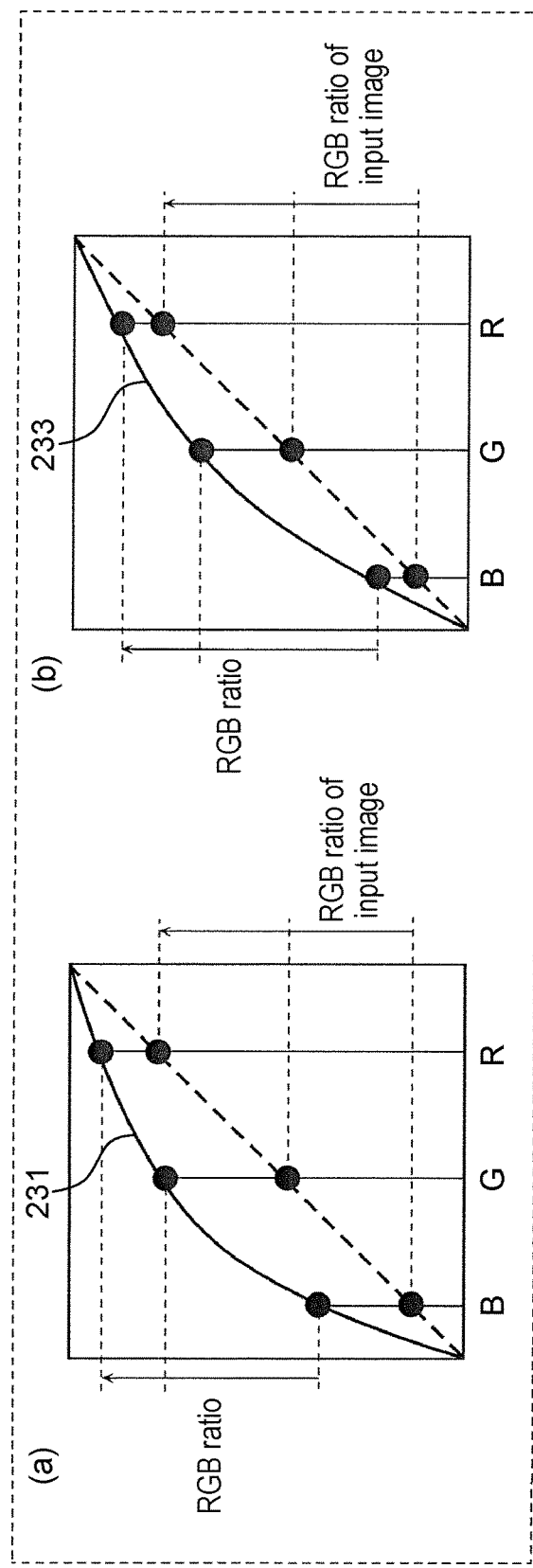
FIG. 8 shows graphs for describing an effect of the image processor according to the first exemplary embodiment.

FIG. 8 shows graphs for describing an effect of image processor 100 according to the first exemplary embodiment. FIG. 8 shows, as input values, pixels each having a larger RGB ratio (specifically, pixels included in second region 212). An RGB ratio used herein corresponds to, among an R signal, a G signal, and a B signal, a difference between a maximum signal and a minimum signal. In examples shown in FIG. 8, an RGB ratio is a difference between an R signal that is a maximum signal and a B signal that is a minimum signal.

FIG. 8(a) shows an example of a comparison using gradation correction curve 231 generated in accordance with first average luminance $Y_1$. When gradation correction curve 231 is used, as shown in FIG. 8(a), a B signal having a smaller input value is converted into a larger output value, but an R signal having a larger input value does not change significantly. As a result, a corrected RGB ratio reduces compared to the RGB ratio before correction. Such a smaller RGB ratio reduces a difference in color, thus a color becomes lighter. When a pixel value of skin region 201 shown in FIG. 2(a) is gradation-corrected, for example, a skin color of skin region 201 changes to a whitish color.

In contrast, FIG. 8(b) shows a case when common curve 233 generated in accordance with correction luminance $Y_c$ is used. When common curve 233 is used, as shown in FIG. 8(b), an amount of change in a B signal having a smaller input value is refrained, compared with a case when gradation correction curve 231 is used. As a result, a corrected RGB ratio does not change significantly compared to the RGB ratio before correction. This means that a color after correction is less likely to become lighter.

As described above, image processor 100 according to the first exemplary embodiment includes curve generator 110 and gradation correcting unit 120. Based on a predetermined correspondence relationship between average luminance of an image and a gradation correction curve, curve generator 110 generates, in accordance with average luminance of input image 200, common curve 233 that is a gradation correction curve used to correct a gradation of input image 200. Gradation correcting unit 120 uses in common, common curve 233 generated by curve generator 110 for each of a red color signal, a green color signal, and a blue color signal of input image 200 to correct a gradation of each of the red color signal, the green color signal, and the blue color signal. Based on first average luminance $Y_1$ that is an average value of luminance of first region 211 in input image 200, second average luminance $Y_2$ that is an average value of luminance of predetermined-colored second region 212 included in first region 211, and an area of second region 212, curve generator 110 generates common curve 233.

That is, image processor 100 generates common curve 233 based on not only first average luminance $Y_1$ but also second average luminance $Y_2$ and an area of second region 212. Common curve 233 thus is a gradation correction curve more suitable for second region 212 than gradation correction curve 231 generated in accordance with first average luminance $Y_1$. This gradation correction can prevent, as shown in FIG. 8, a color of second region 212 from being lightened. As a result, image processor 100 can improve an image quality of input image 200. In particular, an entirely dark image that is difficult to view by a viewer can be brightened in a natural gradation, and, at the same time, a change in color due to this gradation correction can be kept in minimum.

In addition, in the first exemplary embodiment, for example, curve generator 110 uses second average luminance $Y_2$ and an area of second region 212 to correct first average luminance $Y_1$, to calculate correction luminance $Y_c$, and, based on the above described correspondence relationship, to generate common curve 233 in accordance with correction luminance $Y_c$. In the first exemplary embodiment, for example, curve generator 110 performs a weighting addition between first average luminance $Y_1$ and second average luminance $Y_2$ to calculate correction luminance $Y_c$. A weighting factor (correction parameter α) for such a weighting addition is determined based on a percentage of an area of second region 212 to an area of first region 211.

As described above, image processor 100 uses common curve 233 generated in accordance with correction luminance $Y_c$ to correct a gradation. Correction luminance $Y_c$ is a value obtained by correcting first average luminance $Y_1$ based on second average luminance $Y_2$ of second region 212 and a correction parameter α determined based on an area of second region 212. Common curve 233 thus is a gradation correction curve more suitable for second region 212 than gradation correction curve 231 generated in accordance with first average luminance $Y_1$. This gradation correction can prevent a color of second region 212 from being lightened. As a result, image processor 100 can improve an image quality of input image 200.

In addition, in the first exemplary embodiment, for example, second region 212 is a region of a memory color such as skin color, green color, and sky blue color.

A memory color such as skin color includes a color that changes significantly when a gradation is greatly corrected. This means that image processor 100 according to the first exemplary embodiment is particularly beneficial for memory colors and other similar colors. In other words, image processor 100 can prevent a memory color such as skin color from being changed to improve an image quality.

An image processing method according to a first exemplary embodiment, for example, includes a curve generation step and a gradation correction step. In the curve generation step, based on a predetermined correspondence relationship between average luminance of an image and a gradation correction curve, common curve 233 that is a gradation correction curve used to correct a gradation of input image 200 is generated in accordance with average luminance of input image 200. In the gradation correction step, the generated common curve is used in common for each of a red color signal, a green color signal, and a blue color signal of input image 200 to correct a gradation of each of the red color signal, the green color signal, and the blue color signal. In the curve generation step, based on first average luminance $Y_1$ that is an average value of luminance of first region 211 in input image 200, second average luminance $Y_2$ that is an average value of luminance of predetermined-colored second region 212 included in first region 211, and an area of second region 212, common curve 233 is generated.

The above described comprehensive or specific aspects may be achieved by a system, a device, an integrated circuit, a computer program, or a recording medium such as computer readable CD-ROM, or may be achieved by any combination of such a system, a device, an integrated circuit, a computer program, and a recording medium.

Second Exemplary Embodiment

A second exemplary embodiment will be described below. In an image processor according to the second exemplary embodiment, compared with image processor 100 according to the first exemplary embodiment, a curve generator performs a different process. The curve generator according to the second exemplary embodiment will be described below by focusing on its configuration and operation. However, descriptions of other points that are identical to points of the first exemplary embodiment are omitted or simplified.

Figure 9:
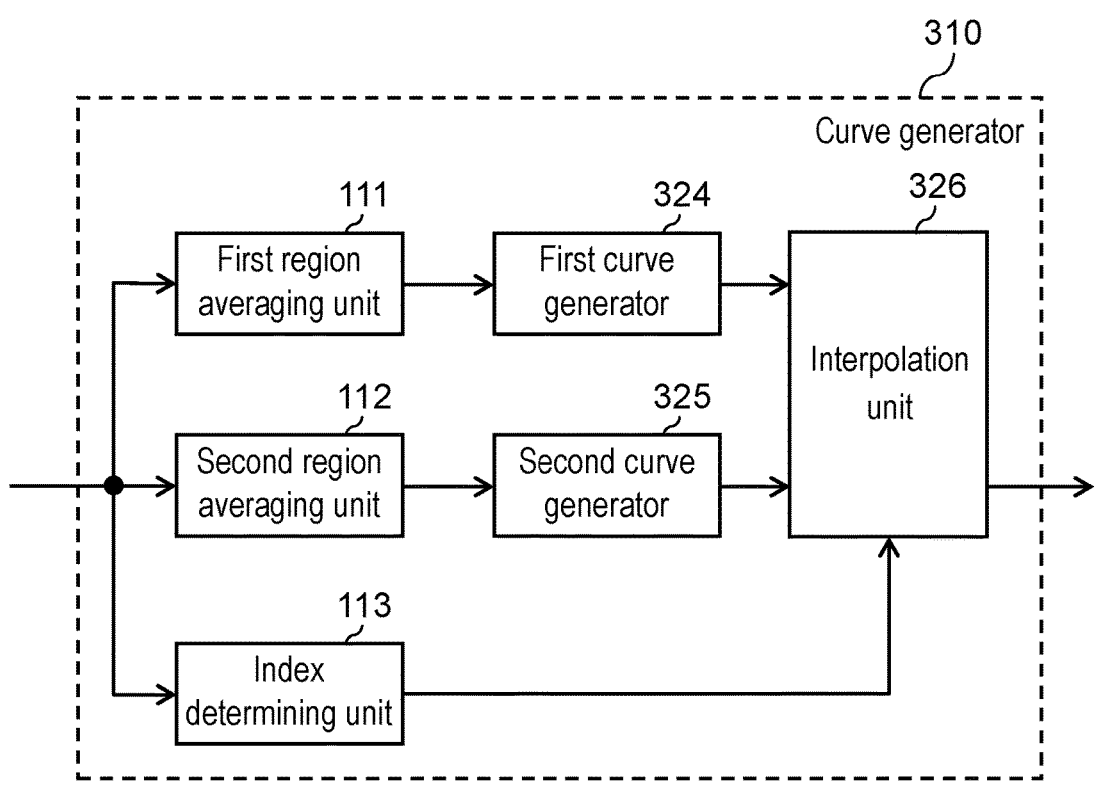
FIG. 9 is a functional block diagram illustrating a detailed configuration of a curve generator of an image processor according to a second exemplary embodiment.

FIG. 9 is a functional block diagram illustrating a detailed configuration of curve generator 310 of image processor 100 according to the second exemplary embodiment.

Curve generator 310 according to the second exemplary embodiment generates a first gradation correction curve and a second gradation correction curve respectively in accordance with first average luminance and second average luminance, and interpolates the generated first gradation correction curve and the second gradation correction curve to generate a common curve. Specifically, as shown in FIG. 9, curve generator 310 includes first region averaging unit 111, second region averaging unit 112, index determining unit 113, first curve generator 324, second curve generator 325, and interpolation unit 326.

Based on a correspondence relationship between average luminance of an image and a gradation correction curve, first curve generator 324 generates a first gradation correction curve in accordance with first average luminance of first region 211. A specific operation of first curve generator 324 is identical to the operation of generator 115 according to the first exemplary embodiment. For example, first curve generator 324 generates gradation correction curve 231 shown in FIG. 6 as a first gradation correction curve.

Based on the correspondence relationship between the average luminance of the image and the gradation correction curve, second curve generator 325 generates a second gradation correction curve in accordance with second average luminance of second region 212. A specific operation of second curve generator 325 is identical to the operation of generator 115 according to the first exemplary embodiment. For example, second curve generator 325 generates gradation correction curve 232 shown in FIG. 6 as a second gradation correction curve.

Interpolation unit 326 generates a common curve by interpolating from the first gradation correction curve and the second gradation correction curve. A weighting factor for interpolation is determined based on a percentage of an area of second region 212 to an area of first region 211. Specifically, the weighting factor for interpolation is a correction parameter α according to the first exemplary embodiment.

For example, interpolation unit 326 uses a correction parameter α to interpolate common curve 233 from gradation correction curve 231 and gradation correction curve 232. A weighting factor for gradation correction curve 231 at this time is 1−α, and a weighting factor for gradation correction curve 232 is α. The more a value of α is approximate to 1, the more common curve 233 becomes similar to gradation correction curve 232. The more a value of α is approximate to 0, the more common curve 233 becomes similar to gradation correction curve 231.

As described above, curve generator 310 according to the second exemplary embodiment generates, based on the above described correspondence relationship, gradation correction curve 231 in accordance with first average luminance $Y_1$, generates, based on the above described correspondence relationship, gradation correction curve 232 in accordance with second average luminance $Y_2$, and generates common curve 233 by interpolating from gradation correction curve 231 and gradation correction curve 232. A weighting factor for interpolation is determined based on a percentage of an area of second region 212 to an area of first region 211.

Therefore, similar to the first exemplary embodiment, a color of skin region 201 in input image 200 is prevented from being lightened.

Third Exemplary Embodiment

Next, a third exemplary embodiment will be described. An image processor according to the third exemplary embodiment uses a reduced image obtained by reducing an input image to generate a common curve. Descriptions will now be given herein by focusing on different points from the first exemplary embodiment. However, descriptions of other points that are identical to points of the first exemplary embodiment are omitted or simplified.

Figure 10:
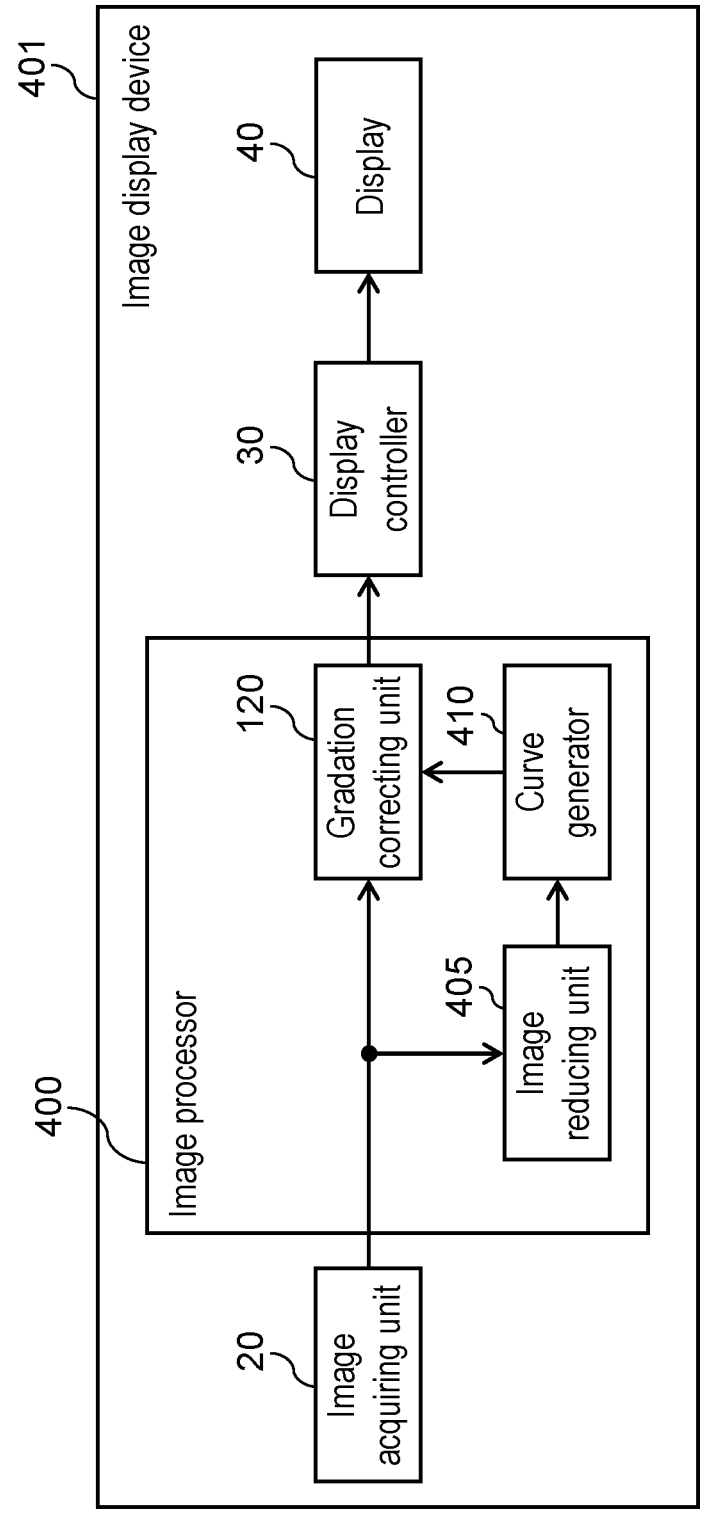
FIG. 10 is a functional block diagram of an image display device according to a third exemplary embodiment.

FIG. 10 is a functional block diagram of image display device 401 including image processor 400 according to the third exemplary embodiment. As shown in FIG. 10, image processor 400 includes image reducing unit 405, curve generator 410, and gradation correcting unit 120.

Image reducing unit 405 reduces input image 200 acquired by image acquiring unit 20. Image reducing unit 405, for example, samples (thins) and averages pixels of input image 200 to reduce input image 200. When input image 200 has a configuration of 1920 pixels×1080 pixels, for example, image reducing unit 405 reduces input image 200 to generate a reduced image having a configuration of 256 pixels×144 pixels.

Curve generator 410 calculates first average luminance and second average luminance of the input image reduced by image reducing unit 405. A specific operation of curve generator 410 is identical to the operation of curve generator 110 according to the first exemplary embodiment, except that a process target is switched from an input image itself to a reduced image of the input image.

As described above, image processor 400 according to the third exemplary embodiment includes image reducing unit 405 for reducing an input image. Curve generator 410 calculates first average luminance $Y_1$ and second average luminance $Y_2$ of an input image reduced by image reducing unit 405.

Since curve generator 410 uses the reduced image to generate a curve, an amount of process for calculating first average luminance and second average luminance can be reduced. Accordingly, even when curve generator 410 is achieved with software, for example, a common curve can be generated with a less amount of process.

First Exemplary Modification

A first exemplary modification to the above described exemplary embodiments will be described below. In the first exemplary modification, an operation of curve generator 110, when an input image includes a plurality of second regions, will be described.

Figure 11:
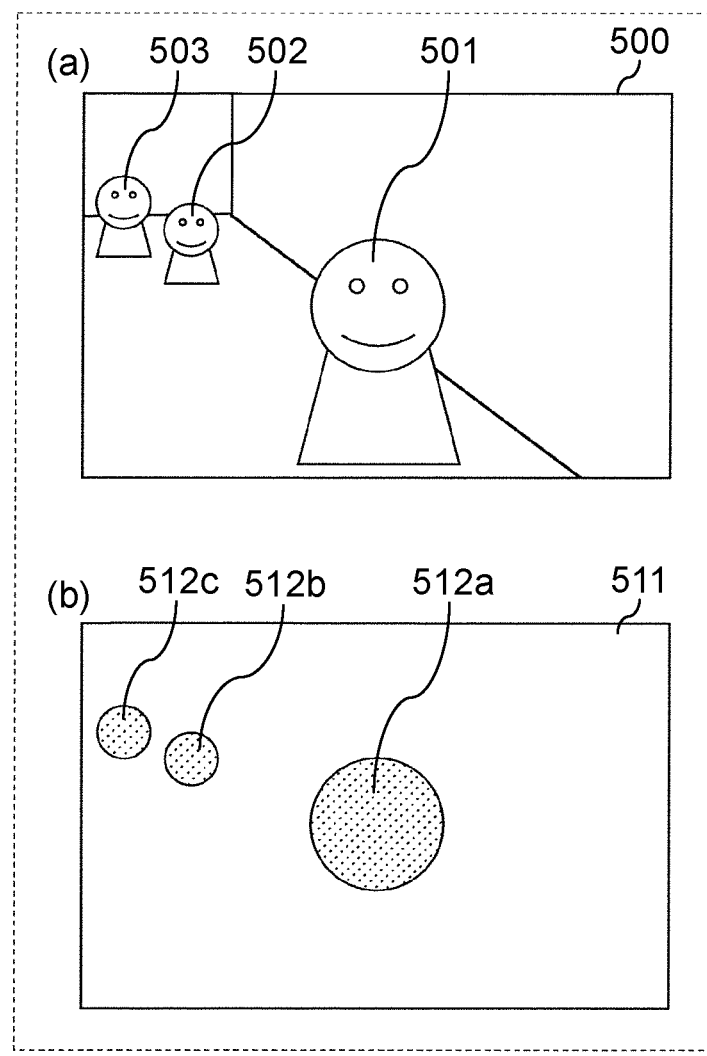
FIG. 11 shows views illustrating an input image according to a first exemplary modification, and a first region and a second region in the input image.

FIG. 11(a) is a view illustrating input image 500 according to the first exemplary modification, and FIG. 11(b) is a view illustrating first region 511 and second regions 512a to 512c in input image 500.

As shown in FIG. 11(a), input image 500 includes a plurality of persons, thus, includes a plurality of skin regions 501 to 503. As shown in FIG. 11(b), first region 511 therefore includes a plurality of second regions 512a to 512c respectively corresponding to skin regions 501 to 503. Similar to the exemplary embodiments, first region 511 is an entire region of input image 500 (specifically, entire screen).

When first region 511 includes a plurality of second regions 512a to 512c, curve generator 110 uses a maximum area value among areas of the plurality of second regions 512a to 512c as an area of the second region to generate a common curve. Specifically, index determining unit 113 calculates the number of pixels included in each of the plurality of second regions 512a to 512c as an area of each of the plurality of second regions. In an example shown in FIG. 11(b), a maximum area is an area of second region 512a. Index determining unit 113 thus calculates a percentage of the area of second region 512a to an area of first region 511 (the number of all pixels in input image 500), and uses the calculated percentage to determine a correction parameter α based on FIG. 5.

As a result, a color of skin region 501 that is most prominent in input image 500 is prevented from being lightened.

In the first exemplary modification, curve generator 110 may use a total value, instead of a maximum value among areas of the plurality of second regions 512a to 512c. Curve generator 110 calculates, as an area of a second region, a total value of numbers of pixels included in the plurality of second regions 512a to 512c.

Second Exemplary Modification

Next, a second exemplary modification will be described. In the second exemplary modification, an operation of curve generator 110, when an input image includes at least one black region, will be described.

Figure 12:
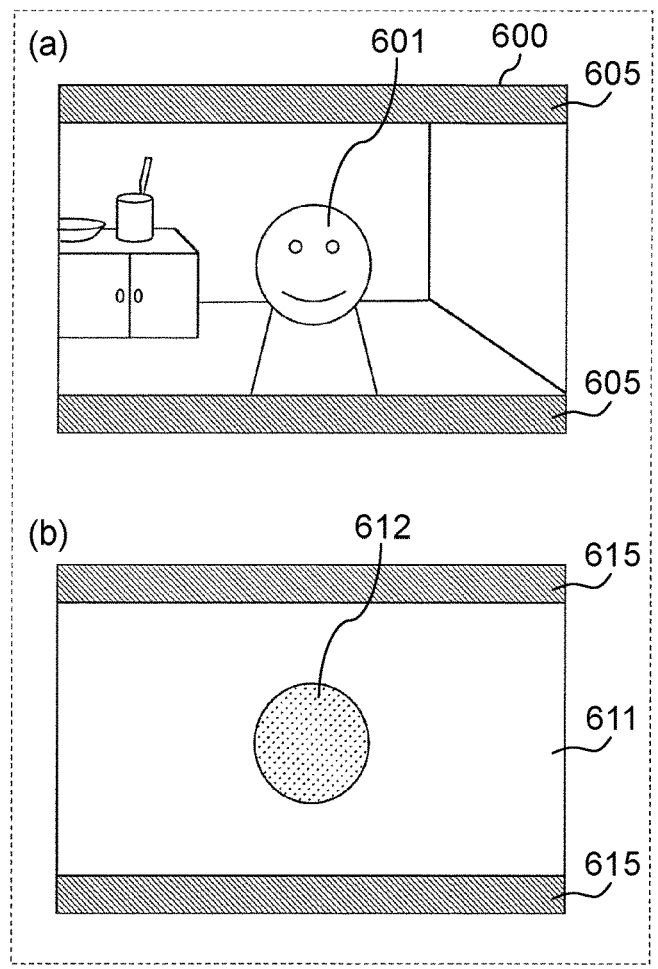
FIG. 12 shows views illustrating an input image according to a second exemplary modification, and a first region and a second region in the input image.

FIG. 12(a) is a view illustrating input image 600 according to the second exemplary modification, and FIG. 12(b) is a view illustrating first region 611 and second region 612 in input image 600.

As shown in FIG. 12(a), belt-shaped masked regions 605 are provided at a top and a bottom of input image 600. Masked regions 605 are, for example, black color regions added in line with an aspect ratio of display 40. Input image 600 shown in FIG. 12(a) is, for example, an image added with masked regions 605 at a top and a bottom of a landscape image having an aspect ratio of 16:9 so as to fit in a display screen having an aspect ratio of 4:3.

When first region 611 is an entire region of input image 600, similar to the above described exemplary embodiments, for example, first average luminance lowers due to an effect of black color region 615. As a result, a gradation correction curve suitable for input image 600 cannot be generated.

In the second exemplary modification, as shown in FIG. 12(b), first region 611 is a region obtained by excluding black color region 615 from the entire region of input image 600. This configuration prevents first average luminance of first region 611 from being lowered. Second region 612 is, similar to the exemplary embodiments, a region corresponding to skin region 601 included in input image 600.

Third Exemplary Modification

Next, a third exemplary modification will be described. In the third exemplary modification, an operation of curve generator 110, when using an area of a second region weighted in accordance with a position of the second region, will be described.

Figure 13:
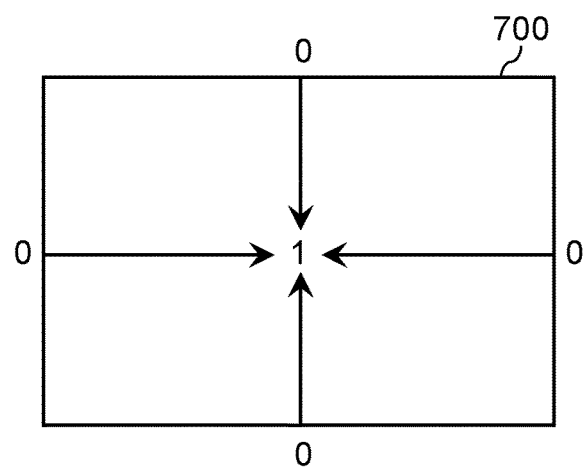
FIG. 13 is a view illustrating weighting of a position of a second region in an input image according to a third exemplary modification.

FIG. 13 is a view illustrating weighting of a position of a second region in input image 700 according to the third exemplary modification. Specifically, the closer a position is to a center of input image 700, the heavier weighting the position is allocated with, and the closer a position is to a periphery of input image 700, the lighter weighting the position is allocated with. For example, the center of the input image is weighted to 1, while the periphery is weighted to 0.

In the third exemplary modification, curve generator 110 uses an area of a second region weighted in accordance with a position of the second region in a first region to generate a common curve.

Index determining unit 113 adds a weighting allocated to each of pixels included in the second region to calculate an area of the second region. Even in a case where second regions each have an identical number of pixels, an area of either of the second regions, whichever positions at a center of input image 700, becomes greater than an area of another of the second regions, which positions near a periphery of input image 700.

Like input image 200 shown in FIG. 2(a), for example, this feature can prevent, when skin region 201 positions at or around a center to which a viewer can easily notice, a color of skin region 201 from being lightened. In other words, this feature can correct a gradation by focusing on an easily noticeable region to effectively improve an image quality of an input image.

Other Exemplary Embodiments

The exemplary embodiments have been described as examples of the technology disclosed in the present application. The technology of the present disclosure is not however limited to the above described exemplary embodiments and modifications, but can be applied to other exemplary embodiments that have been appropriately changed, and, in addition, in which some contents are replaced, added, and/or omitted. In addition, the components described in the above exemplary embodiments and modifications can be combined to make a new exemplary embodiment.

In view of the above circumstances, other exemplary embodiments will be described below.

In the above described exemplary embodiments and modifications, for example, image acquiring unit 20 has acquired an RGB image as an input image, but this is merely an example. For example, image acquiring unit 20 may acquire a YUV image as an input image. A YUV image includes a plurality of pixels arranged in a matrix, where the pixels each include a luminance signal (Y) and two color-difference signals (Cb and Cr).

In this case, image display device 10 includes an RGB converter for converting a YUV image into an RGB image. The RGB converter is disposed, for example, between image acquiring unit 20 and curve generator 110, or between curve generator 110 and gradation correcting unit 120.

In the above described exemplary embodiments and modifications, for example, a second region is a region of a memory color such as a skin color, but this is merely an example. A second region may be, for example, a high saturation region having a saturation of at least a predetermined value. Saturation is represented, for example, by a difference between a maximum signal and a minimum signal among an R signal, a G signal, and a B signal.

This feature can prevent a high-saturation, vivid color of a second region from being lightened. As a result, an image quality of an input image can be improved.

Figure 14:
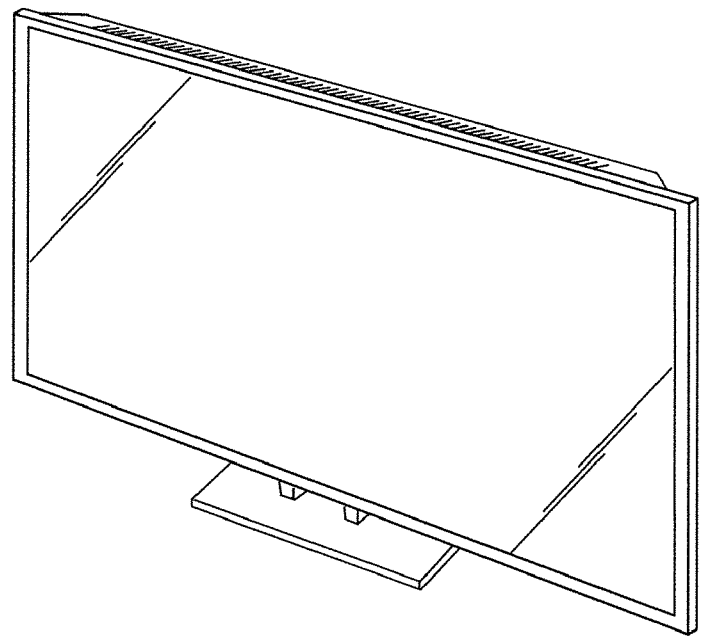
FIG. 14 is an external view of an image display device according to each of the exemplary embodiments or the exemplary modifications.

Image display device 10 according to the above described exemplary embodiments and modifications is, for example, a flat panel display such as television as shown in FIG. 14, for example. Or, image display device 10 may be a personal monitor provided at a seat in an airplane.

In the above described exemplary embodiments and modifications, each component may be configured with dedicated hardware, or may be achieved by executing a software program suitable for each component. Each component may be achieved when a program executing unit such as Central Processing Unit (CPU) or processor reads and executes a software program recorded in a recording medium such as hard disk or semiconductor memory.

The present disclosure can be achieved as not only an image processor, but also a program including, as a step, a process performed by each component of an image processor, and a recording medium recorded with the program, such as computer readable Digital Versatile Disc (DVD).

In other words, the above described comprehensive or specific aspects may be achieved by a system, a device, an integrated circuit, a computer program, or a computer readable recording medium, or may be achieved by any combination of such a system, a device, an integrated circuit, a computer program, and a recording medium.

The exemplary embodiments and modifications have been described as examples of the technology of the present disclosure. The accompanied drawings and detailed descriptions have been provided for description purposes.

However, some components described in the accompanied drawings and detailed descriptions can include, not only essential components for solving problems, but also, for exemplifying the above described technologies, components that are not essential for solving problems. Therefore, even though the accompanying drawings and detailed descriptions include components that are not essential, such components that are not essential should not be directly construed as essential components.

In addition, since the above exemplary embodiments and modifications merely describe the technology of the present disclosure, various changes, replacements, additions, omissions, and other amendments are allowed within the scope or its equivalent scope of the claims.

An image processor according to the present disclosure can be utilized for various applications including, for example, televisions, monitors, and cameras.

What is claimed is:
1. An image processor comprising:
 a memory storing a predetermined correspondence relationship between a plurality of average luminance values of an image and a plurality of gradation correction curves, the plurality of average luminance values corresponding to the plurality of gradation correction curves, respectively;
 a curve generator for generating a common curve, based on the predetermined correspondence relationship, in accordance with average luminance of an input image, the common curve being a gradation correction curve used to correct a gradation of the input image; and
 a gradation correcting unit for correcting a gradation of each of a red color signal, a green color signal, and a blue color signal of the input image, by using in common the common curve generated by the curve generator for each of the red color signal, the green color signal, and the blue color signal,
 wherein the curve generator generates the common curve based on first average luminance that is an average value of luminance of a first region in the input image, second average luminance that is an average value of luminance of a predetermined-colored second region included in the first region, and an area of the second region, the curve generator calculates correction luminance by correcting the first average luminance using the second average luminance and the area of the second region, and generates the common curve, based on the correspondence relationship, in accordance with the correction luminance, the curve generator generates, based on the correspondence relationship, a first gradation correction curve in accordance with the first average luminance, generates, based on the correspondence relationship, a second gradation correction curve in accordance with the second average luminance, and generates the common curve by interpolating from the first gradation correction curve and the second gradation correction curve, and a weighting factor for interpolation is determined based on a percentage of the area of the second region to the area of the first region.

2. The image processor according to claim 1, wherein, when the first average luminance is lower than the second average luminance, the curve generator generates the common curve based on the first average luminance, the second average luminance, and the area of the second region.

3. The image processor according to claim 1, wherein the curve generator performs a weighting addition between the first average luminance and the second average luminance to calculate the correction luminance, and a weighting factor for the weighting addition is determined based on a percentage of the area of the second region to an area of the first region.

4. The image processor according to claim 1, wherein, when the first region includes a plurality of the second regions, the curve generator uses, as the area of the second region, a total value of areas of the plurality of the second regions or a largest value among areas of the plurality of the second regions to generate the common curve.

5. The image processor according to claim 1, wherein the curve generator uses the area of the second region weighted in accordance with a position of the second region in the first region to generate the common curve.

6. The image processor according to claim 1, wherein the second region is a region of a memory color including a skin color, a green color, or a sky blue color.

7. The image processor according to claim 1, wherein the second region is a high saturation region having a saturation equal to or above a predetermined value.

8. The image processor according to claim 1, wherein the first region is a region obtained by excluding, from an entire region of the input image, a black color region provided in a belt shape at least one of top, bottom, left, and right.

9. The image processor according to claim 1, further comprising a reducing unit for reducing the input image, wherein the curve generator calculates the first average luminance and the second average luminance of the input image reduced by the reducing unit.

10. The image processor according to claim 1, wherein the curve generator selects two gradation correction curves among the plurality of gradation correction curves, the two gradation correction curves corresponding to two average luminance values corresponding to the correction luminance, and the curve generator generates the common curve based on the correction luminance and the two gradation correction curves.

11. An image processing method comprising:

storing, in memory, a predetermined correspondence relationship between a plurality of average luminance values of an image and a plurality of gradation correction curves, the plurality of average luminance values corresponding to the plurality of gradation correction curves, respectively;

generating a common curve, based on the predetermined correspondence relationship, in accordance with average luminance of an input image, the common curve being a gradation correction curve used to correct a gradation of the input image; and correcting a gradation of each of a red color signal, a green color signal, and a blue color signal of the input image, by using in common the generated common curve for each of the red color signal, the green color signal, and the blue color signal, wherein, in generation of the common curve, the common curve is generated based on first average luminance that is an average value of luminance of a first region in the input image, second average luminance that is an average value of luminance of predetermined-colored second region included in the first region, and an area of the second region, wherein correction luminance is calculated by correcting the first average luminance using the second average luminance and the area of the second region, and the common curve is generated, based on the correspondence relationship, in accordance with the correction luminance, wherein a first gradation correction curve in accordance with the first average luminance is generated, based on the correspondence relationship, a second gradation correction curve in accordance with the second average luminance is generated, based on the correspondence relationship, and the common curve is generated by interpolating from the first gradation correction curve and the second gradation correction curve, and wherein a weighting factor for interpolation is determined based on a percentage of the area of the second region to the area of the first region.

* * * * *